US012573670B2

(12) United States Patent
Wang et al.

(10) Patent No.: US 12,573,670 B2
(45) Date of Patent: Mar. 10, 2026

(54) BATTERY CELL WITH REFERENCE ELECTRODE

(71) Applicant: Cummins Inc., Columbus, IN (US)

(72) Inventors: Yujun Wang, Columbus, IN (US); Ruigang Zhang, Columbus, IN (US); Yanli Yin, Columbus, IN (US); Connor Ryan, Columbus, IN (US)

(73) Assignee: Cummins Inc., Columbus, IN (US)

( * ) Notice: Subject to any disclaimer, the term of this patent is extended or adjusted under 35 U.S.C. 154(b) by 564 days.

(21) Appl. No.: 18/089,080

(22) Filed: Dec. 27, 2022

(65) Prior Publication Data

US 2023/0223603 A1      Jul. 13, 2023

Related U.S. Application Data

(60) Provisional application No. 63/298,400, filed on Jan. 11, 2022.

(51) Int. Cl.
| | |
|---|---|
| *H01M 10/42* | (2006.01) |
| *H01M 4/134* | (2010.01) |
| *H01M 10/04* | (2006.01) |
| *H01M 10/44* | (2006.01) |
| *H01M 10/643* | (2014.01) |

(52) U.S. Cl.
CPC ....... H01M 10/4235 (2013.01); H01M 4/134 (2013.01); H01M 10/0459 (2013.01); H01M 10/441 (2013.01); H01M 10/643 (2015.04); *H01M 2010/4271* (2013.01)

(58) Field of Classification Search
CPC ........... H01M 10/4235; H01M 10/643; H01M 4/134; H01M 10/0459; H01M 10/441; H01M 2010/4271
See application file for complete search history.

(56) References Cited

U.S. PATENT DOCUMENTS

| | | | |
|---|---|---|---|
| 8,163,410 B2 | 4/2012 | Fulop | |
| 8,541,122 B2 | 9/2013 | Fulop | |
| 8,586,222 B2 | 11/2013 | Timmons | |
| 8,679,677 B1 * | 3/2014 | Tamaki | H01M 10/0445 429/234 |
| 9,847,558 B1 * | 12/2017 | Wang | H01M 50/569 |
| 9,847,560 B2 | 12/2017 | Kohlberger | |
| 9,929,445 B2 | 3/2018 | Yu et al. | |
| 10,978,683 B2 | 4/2021 | Min et al. | |
| 2009/0104510 A1 | 4/2009 | Fulop et al. | |
| 2011/0250478 A1 | 10/2011 | Timmons et al. | |

(Continued)

FOREIGN PATENT DOCUMENTS

| | | | | |
|---|---|---|---|---|
| CN | 111082151 A | 4/2020 | | |
| GB | 2593187 | * | 9/2021 | H01M 50/204 |

(Continued)

*Primary Examiner* — Milton I Cano

(74) *Attorney, Agent, or Firm* — Faegre Drinker Biddle & Reath LLP

(57) ABSTRACT

Battery cells, each including an electrolyte, first and second working electrodes in the electrolyte, and first and second reference electrodes in the electrolyte, are disclosed. The first and second reference electrodes each comprises an active material on a current collector. The active material of the first reference electrode is different from the active material of the second reference electrode.

17 Claims, 13 Drawing Sheets

(56)　　　　　　References Cited

U.S. PATENT DOCUMENTS

| | | | | |
|---|---|---|---|---|
| 2014/0375325 A1* | 12/2014 | Wang | ..................... | H01M 4/70 |
| | | | | 324/426 |
| 2015/0111077 A1* | 4/2015 | Paik | ................. | H01M 10/0525 |
| | | | | 205/59 |
| 2015/0147614 A1* | 5/2015 | Wang | ................ | G01R 31/3835 |
| | | | | 429/93 |
| 2018/0205049 A1* | 7/2018 | Min | ..................... | H01M 10/44 |
| 2021/0091369 A1* | 3/2021 | Dadheech | ......... | H01M 10/0525 |

FOREIGN PATENT DOCUMENTS

| | | | | |
|---|---|---|---|---|
| GB | 2594916 | * | 11/2021 | .......... H01M 50/547 |
| GB | 2598534 | * | 9/2022 | ............ H01M 50/24 |
| JP | 2016076358 A | | 5/2016 | |
| WO | 2015085580 A1 | | 6/2015 | |
| WO | 2020201009 A1 | | 10/2020 | |

* cited by examiner

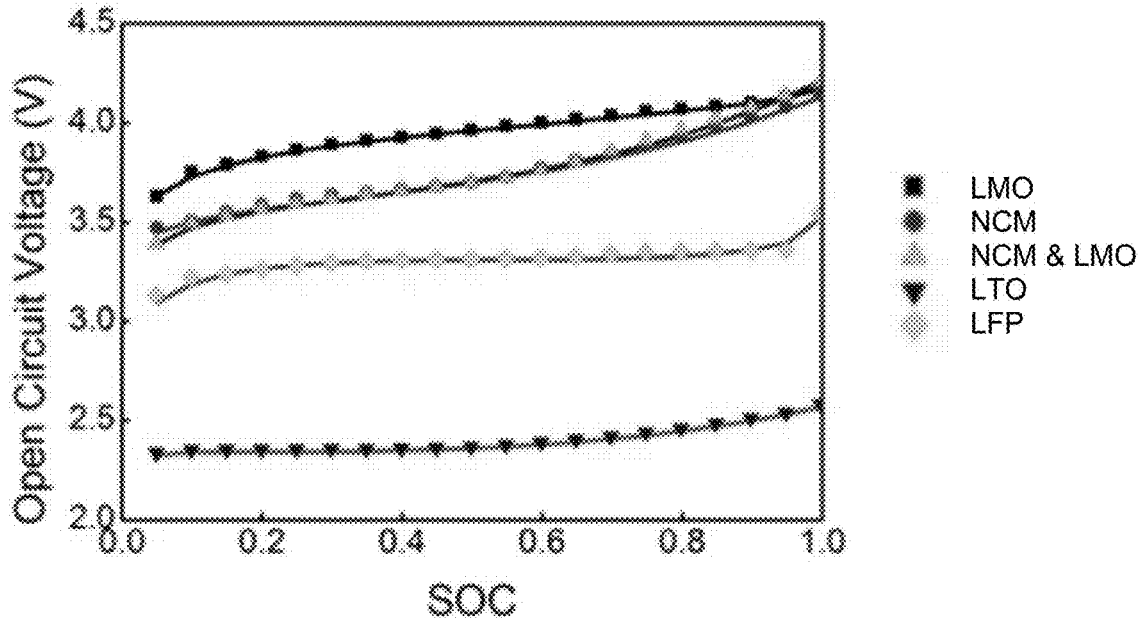
Fig. 8
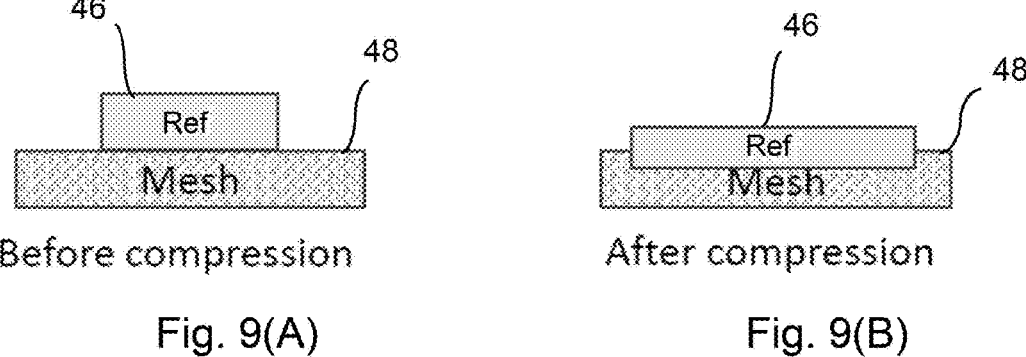
Before compression
Fig. 9(A)
After compression
Fig. 9(B)

BATTERY CELL WITH REFERENCE ELECTRODE

CROSS REFERENCE TO RELATED APPLICATION

This application claims benefit of U.S. Provisional Application No. 63/298,400, filed Jan. 11, 2022, the disclosure of which is incorporated herein by reference in its entirety for all purposes.

FIELD OF THE DISCLOSURE

The present disclosure relates to a battery cell, and in particular a battery cell with a reference electrode which can allow battery parameters such as state of charge and/or state of health to be monitored. The present disclosure has particular, but not exclusive, application in battery cells for use in battery packs for traction applications, such as electric or hybrid electric vehicles.

BACKGROUND

Electric vehicles and hybrid electric vehicles, such as cars, buses, vans and trucks, use battery packs that are designed with a high ampere-hour capacity in order to give power over sustained periods of time. A battery pack comprises a large number of individual electrochemical cells connected in series and parallel to achieve the total voltage and current requirements. Typically, Lithium ion (Li-ion) battery cells are used as they provide a relatively good cycle life and energy density.

Battery packs typically contain a battery management system (BMS) which is responsible for monitoring and management of the cells in the battery pack. During operation, the battery management system may estimate an inner state of the battery, such a state of charge (SOC) and/or a state of health (SOH). The SOC provides information about the current amount of energy stored in the battery, and thus may be used to control charging and as an indicator of available range. The SOH is a figure of merit that indicates the level of battery degradation. Knowledge of the battery's SOH can allow battery fault diagnosis, help to manage energy distribution, and can be used to organise maintenance and replacement schedules.

Conventional techniques for determining a battery cell's SOC and SOH involve measuring the voltage (potential difference) across its terminals. However, aging effects may reduce the reliability of the cell voltage as an indicator of SOC or SOH. It has therefore been proposed to provide a battery cell with a reference electrode. The reference electrode is used for instantaneous potential difference measurements and is not involved in cell charging or discharging. By monitoring the potential difference between the reference electrode and each of the working electrodes, a more accurate estimate of state of charge may be obtained.

However, it has been found that the measurements provided by a reference electrode may drift over time. It would therefore be desirable to provide a battery cell which can allow stable monitoring of battery parameters over time. It would also be desirable to provide a battery cell which can facilitate lithium plating detection and expansion estimation.

SUMMARY

According to one aspect of the disclosure there is provided a battery cell comprising:
an electrolyte;
first and second working electrodes in the electrolyte; and
first and second reference electrodes in the electrolyte;
wherein the first and second reference electrodes each comprises an active material on a current collector, and the active material of the first reference electrode is different from the active material of the second reference electrode.

The present disclosure may provide the advantage that, by providing first and second reference electrodes with different active materials, it may be possible to monitor battery parameters such as SOC and SOH more accurately over time than if a single active material were used. Furthermore, the use of different active materials may allow charging/discharging of the reference electrodes for calibration purposes. Thus, the use of first and second reference electrodes with different active materials may help to address age drifting effects which may otherwise occur. In addition, the use of different active materials on the reference electrodes may facilitate the monitoring of other parameters such as the onset of lithium plating and battery expansion.

In some examples, the first and second working electrodes each comprises an active material on a current collector, and the active material of the first working electrode is different from the active material of the second working electrode. For example, one embodiment, the battery cell is a Lithium-ion battery cell comprising an anode and a cathode as working electrodes. In this case, the active material of the cathode may comprise a Lithium metal oxide or phosphate and the active material of the anode may comprise carbon (graphite). However, other types of battery and materials are also possible.

In some examples, the active materials of the first and second reference electrodes are different from the active materials of the first and second working electrodes. This may allow a voltage (potential difference) between the first reference electrode and each of the working electrodes and a potential difference between the second reference electrode and each of the working electrodes to be obtained. This may help to improve the accuracy with which battery parameters can be monitored.

The active materials of the first and second reference electrodes are, in some examples, selected to have a non-zero potential difference (for example, a potential difference of at least 0.1V or 0.2V) with each of the working electrodes. This may help to ensure that reference measurements between the reference electrodes and the active electrodes can be taken.

In some examples, the active materials of the first and second reference electrodes are selected from: a lithium (Li) metal, bismuth (Bi) metal or tin (Sn) metal; other types of metal capable of undergoing a lithiation and de-lithiation process; and any other material capable of undergoing a lithiation and de-lithiation process with a relatively stable electrochemical potential plateau. The active materials are, in some examples, selected to have a wide voltage plateau (for example, a substantially constant voltage) during the lithiation and de-lithiation process (during operation of the battery). This may help to ensure the stability of the measurements. For example, the active materials may be a lithium metal oxide or based on another metal such as tin (Sn) or bismuth (Bi). In one non-limiting embodiment, the active materials of the first and second reference electrodes may be selected from: lithium-ion manganese oxide (LMO); lithium nickel manganese cobalt oxide (NCM); lithiumtitanate-oxide (LTO); lithium ferrophosphate (LFP); and combinations thereof, although other materials may be used instead.

In some examples, the battery cell comprises a container which contains the working electrodes, the reference electrodes and the electrolyte. In this case, each of the first and second working electrodes and each of the first and second reference electrodes may comprise a terminal extending out of the container. This may facilitate sensing of the voltages of the various electrodes. The container may be, for example, a pouch, a prismatic cell container or a cylindrical cell container, or any other suitable type of container.

In one embodiment, the current collector of each of the first and second reference electrodes is substantially planar. The active material may be provided on one side only of the current collector, or on both sides of the current collector. In this case, the reference electrodes may be substantially planar. This may allow the reference electrodes to be sandwiched between a plurality of working electrodes, for example, in a pouch cell or a prismatic cell. Alternatively, the reference electrodes may be substantially cylindrical, which may allow them to be provided for example at the centre of a cylindrical cell. It will be appreciated that other shapes of reference electrode and types of cell are also possible.

The first and second reference electrodes may be smaller than or a similar size to the first and second working electrodes. For example, the width and/or height of the reference electrode may be less than or equal to that of a working electrode, for example, between 1% and 95%. In one embodiment, the first and second reference electrodes are a similar size and/or shape to the first and second working electrodes. This may help to maximise a contact area between the reference electrodes and the electrolyte, which may help to improve the accuracy of voltage measurements. For example, where the reference electrodes are substantially planar, they may have a width and/or height in a direction perpendicular to the plane of the electrode which is substantially the same as the width and/or height of a working electrode. For example, the width and/or height of the reference electrode may be at least 50%, 60%, 70%, 80% or 90% that of a working electrode.

Where the reference electrodes are cylindrical, they may have a height in a direction parallel to their longitudinal axis which is less than or equal to the height of the working electrodes. For example, the height of the reference electrode may be between 1% and 95% that of a working electrode, or at least 50%, 60%, 70%, 80% or 90% that of a working electrode.

In one embodiment, the current collector of at least one of the first and second reference electrodes comprises a mesh and the active material is pressed into the mesh. For example, the active material may be compressed into the current collector using a high pressure applied in a direction perpendicular to the plane of the current collector. This may help to ensure good contact between the active material and the current collector and may help to improve the durability.

In some examples, the battery cell further comprises a separator between the first and second reference electrodes. The separator is, in some examples, a porous separator which physically separates the first and second reference electrodes but which provides ion diffusion channels in the battery cell.

In some examples, the first and second reference electrodes and the separator form a reference electrode unit. The reference electrode unit may be accommodated in the battery cell. For example, the reference electrode unit may be provided as an addition to a standard battery cell, which may facilitate manufacturing. The reference electrode unit is, in some examples, designed so as not to have a significant impact on the charge/discharge operation of the cell. For example, the reference electrode unit may occupy less than 10%, 5%, 3% or 2% of the volume of the cell (for example, between 0.2% and 2%), although other values are possible.

In one embodiment, the reference electrode unit is substantially planar. In this case, the reference electrode unit may be provided between (or adjacent to) a plurality of planar working electrodes, for example in a pouch cell or a prismatic cell. In another embodiment, the reference electrode unit is substantially cylindrical. In this case the cylindrical reference electrode unit may be provided, for example, at the centre of a cylindrical cell.

According to another aspect of the present disclosure there is provided a battery pack comprising a plurality of battery cells, each of the battery cells comprising:

an electrolyte; and first and second working electrodes in the electrolyte, wherein at least one of the battery cells further comprises first and second reference electrodes in the electrolyte, wherein the first and second reference electrodes each comprises an active material on a current collector, and wherein the active material of the first reference electrode is different from the active material of the second reference electrode.

This aspect of the disclosure may provide the advantage that a representative cell in the battery pack can be provided with the first and second reference electrodes for use in monitoring parameters of the battery pack.

In some examples, the battery pack comprises at least one voltage sensor. In this case, the at least one voltage sensor may be arranged to sense a voltage between the first reference electrode and at least one of the working electrodes, and to sense a voltage between second reference electrode and at least one of the working electrodes. In some examples, the at least one sensor is arranged to sense a voltage between each reference electrode and each working electrodes. The at least one sensor may also be arranged to sense a voltage between the working electrodes and/or between the reference electrodes.

The sensed voltages may be used to monitor parameters of the battery pack. For example, the battery pack may further comprise a monitoring unit arranged to monitor a parameter of the battery pack based on a sensed voltages. The parameter may be, for example, at least one of: state of charge (SOC); state of health (SOH); onset of lithium plating; battery expansion; and/or any other suitable parameter.

In one embodiment, the battery pack comprises a voltage sensor arranged to sense a voltage between the first and second reference electrodes, and the monitoring unit is arranged to monitor the sensed voltage and to output a signal indicating reference electrode drift when a change in the sensed voltage over time exceeds a threshold. This may provide an indication that the accuracy with which a parameter of the battery pack can be monitored has decreased and/or may allow action to be taken to help compensate for or correct the drift.

In one embodiment, the monitoring unit is configured to perform a charge/discharge cycle of the reference electrodes in dependence on the signal indicating reference electrode drift. This may help to recalibrate the reference electrodes.

In some examples, the reference electrodes are provided in at least one but not all of the battery cells in the battery pack. For example, the reference electrodes may be provided in one or more representative cells, which may be for example those cells which are expected to experience the largest changes in temperature. This may facilitate accurate monitoring of battery parameters using in cell sensors without requiring reference electrodes to be provided in all of the battery cells.

Corresponding methods may also be provided. Thus, according to another aspect of the present disclosure, there is provided a method of monitoring a battery cell, the battery cell comprising first and second working electrodes and first and second reference electrodes in an electrolyte, wherein the first and second reference electrodes each comprises an active material on a current collector, and the active material of the first reference electrode is different from the active material of the second reference electrode, the method comprising:

sensing a voltage between the first reference electrode and at least one of the working electrodes;

sensing a voltage between the second reference electrode and at least one of the working electrodes; and monitoring a parameter of the battery cell based on the sensed voltages.

Features of one aspect of the disclosure may be used with any other aspect. Any of the apparatus features may be provided as method features and vice versa.

BRIEF DESCRIPTION OF THE DRAWINGS

The features of the present disclosure according to some examples or embodiments will now be described, purely by way of example, with reference to the accompanying drawings, in which:

FIG. 8 shows plots of open circuit voltage against state of charge for candidate materials for reference electrodes;

FIGS. 9A and 9B illustrate how an active material for a reference electrode can be attached to a current collector in one embodiment;

DETAILED DESCRIPTION

Overview of a Battery Pack

Figure 1:
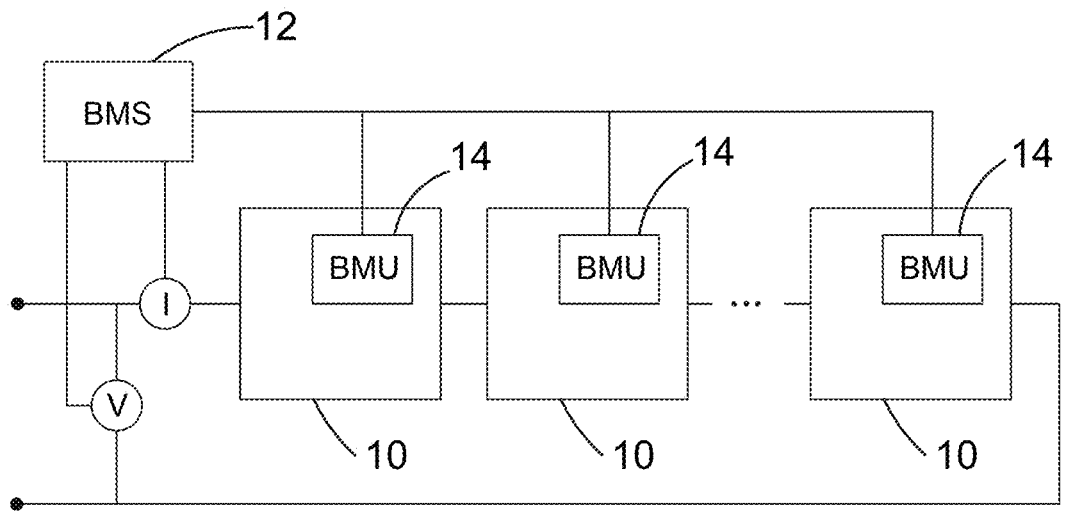
FIG. 1 shows parts of a typical battery pack for use in an electric or hybrid electric vehicle.

FIG. 1 shows parts of a typical battery pack for use in an electric or hybrid electric vehicle. Referring to FIG. 1, the battery pack comprises a plurality of battery modules 10 electrically connected in series and/or parallel to achieve the target pack voltage. A battery management system 12 monitors the voltage and current and manages overall operation of the battery pack. Each battery module 10 comprises a plurality of battery cells electrically connected in series and/or parallel. Each battery module 10 includes a battery management unit 14 which monitors and manages charge and discharge of the cells in that module. Although not shown in FIG. 1, each battery management unit 14 includes voltage sensors which sense the voltages of individual cells or groups of cells. Each battery management unit may also include one or more temperature and/or pressure sensors which sense the temperature and/or pressure of the module and/or individual cells or groups of cells. The battery management system 12 communicates with the battery management unit 14 in each of the modules 10 to monitor and manage overall operation of the battery pack. The battery management system and each of the battery management units include a processor with the appropriate software, along with memory and other components, which are used to monitor and manage charge and discharge. The battery pack may be, for example, as disclosed in United Kingdom patent applications GB 2003901.2, GB 2003902.0 and GB 2003903.8, the subject matter of each of which is incorporated herein by reference.

Figure 2:
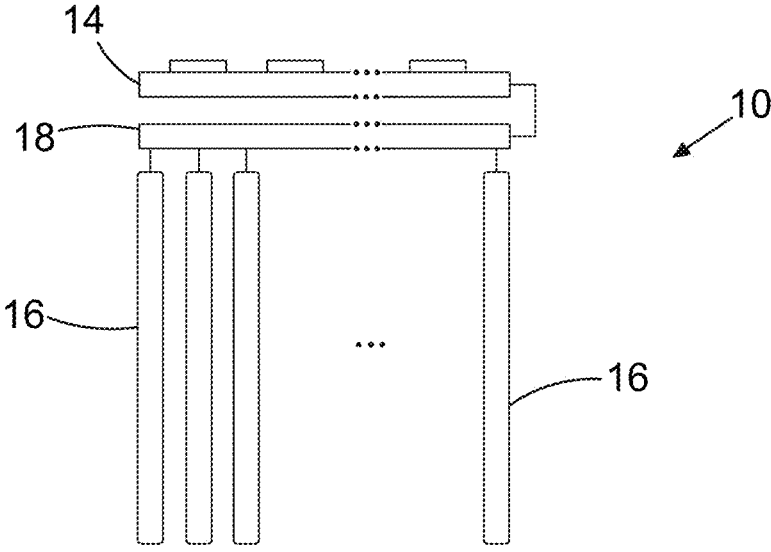
FIG. 2 shows parts of a battery module.

FIG. 2 shows parts of a battery module in one possible configuration. Referring to FIG. 2, the battery module comprises a plurality of battery cells 16, a busbar 18 and a battery management unit 14. In this embodiment, the battery cells 16 are pouch cells or prismatic cells stacked together side-by-side. However, other types of cell, such as cylindrical cells, could be used instead. The busbar 18 is used to connect the battery cells 16 in the required series/parallel configuration. The busbar 18 includes voltage sensors which monitor the voltages of individual battery cells, or groups of battery cells connected in parallel. A current sensor senses total current through the module. In addition, one or more temperature and/or pressure sensors are used to sense the temperature and/or pressure of the module. The busbar 18 is connected to the battery management unit 14. The battery management unit receives the sensed voltages, current and temperature. The sensed voltages, current and temperature are used to monitor and manage cell charge and discharge.

Figure 3:
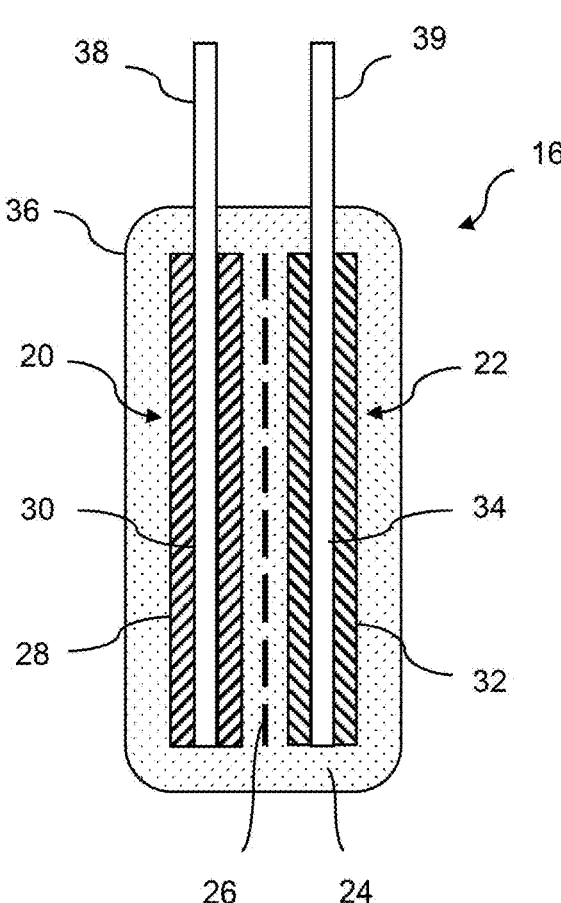
FIG. 3 shows schematically parts of a typical battery cell.

FIG. 3 shows schematically parts of a typical battery cell. In this embodiment the battery cell is a Lithium-ion cell, although other types of cell could be used instead. Referring to FIG. 3, the battery cell 16 comprises a cathode 20, an anode 22, an electrolyte 24 and a separator 26. The cathode 20 comprises an active layer 28 on a current collector 30. The active layer 28 is typically a Lithium metal oxide such as Lithium Cobalt Oxide ($LiCoO_2$) or Lithium Nickel Cobalt Manganese Oxide ($LiNi_xCo_yMn_zO_2$). The current collector 30 is typically aluminium. The anode 22 comprises an active layer 32 which is typically carbon (graphite) on a current collector 34 which is typically copper. A passivating layer (not shown) may be provided on the anode active layer 32 to ensure its stability. The electrolyte 24 is typically a lithium salt in an organic solvent. The separator 26 is a porous separator which keeps the cathode 20 and the anode 22 physically apart to prevent short circuits but allows ion diffusion channels between the two. The separator may be formed for example from a synthetic polymer. The battery cell 16 is typically packaged in a container 36 such as a cylindrical case, a prismatic case or a pouch. The cathode current collector 30 and the anode current collector 34 may extend out of the container 36 to provide terminal tabs 38, 39 and/or may be electrically connected to positive and negative terminals respectively. If desired, a plurality of anodes and cathodes may be provided within the same container in order to increase the capacity of the cell. It will be appreciated that the components, materials and arrangements described above are given by way of example only, and other components, materials and arrangements may be used instead, as is known in the art.

Figures 4A, 4B:
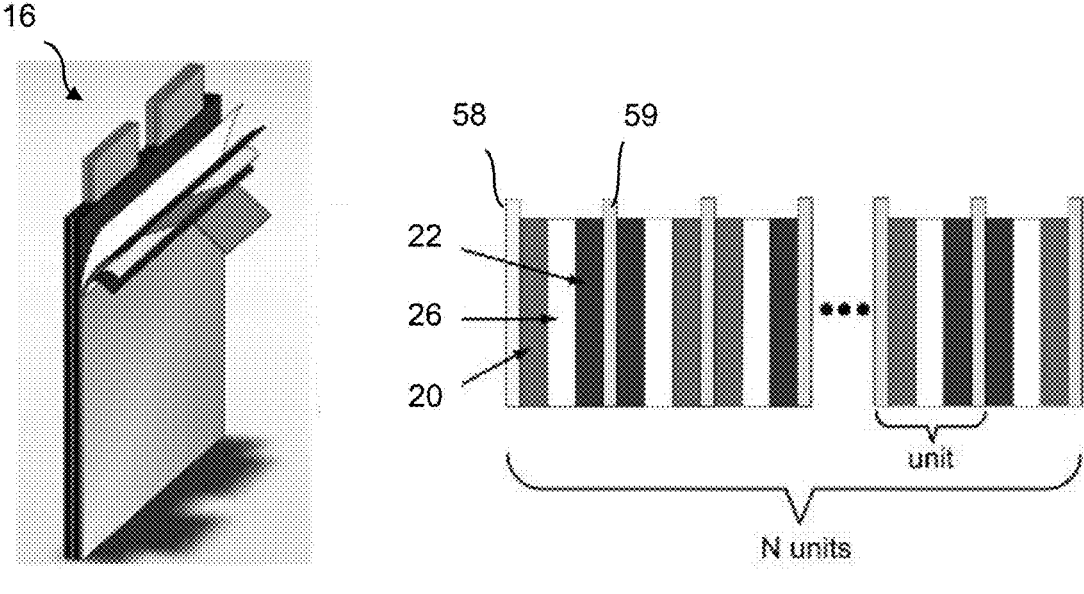
FIGS. 4(A) and 4(B) illustrate how a plurality of anodes and cathodes can be stacked together to form a pouch cell.

FIG. 4(A) illustrates how a plurality of anodes and cathodes can be stacked together to form a pouch cell 16. FIG. 4(B) shows schematically the internal composition of such a pouch cell, with a plurality of anode/cathode units stacked together.

When a battery pack is used in an electric vehicle application, it is desirable to have knowledge of its state of charge (SOC) in order to assist with charging and estimating remaining vehicle range. Knowledge of the battery pack's state of health (SOH) is useful for an operator when organising maintenance and replacement schedules. Furthermore, if the SOH is monitored in real time, it can allow battery fault diagnosis which may help to prevent hazardous situations from arising. Real time SOH estimation can also provide knowledge about the battery performance that can help to manage the energy distribution. In addition, real time SOH estimation can help with accurate estimation of SOC.

Reference Electrodes

In embodiments of the disclosure, reference electrodes are built into a battery cell. The reference electrodes are used only for open circuit voltage measurements and are not involved in cell charging/discharging. The reference electrodes can provide a built-in sensor for SOC and SOH estimation. In addition, the reference electrodes can help detect the onset of lithium plating. Furthermore, the reference electrodes can be used to estimate battery expansion using the relevant calculations. The reference electrodes have no overpotential, which helps improve the accuracy of the voltage measurements.

Figure 5:
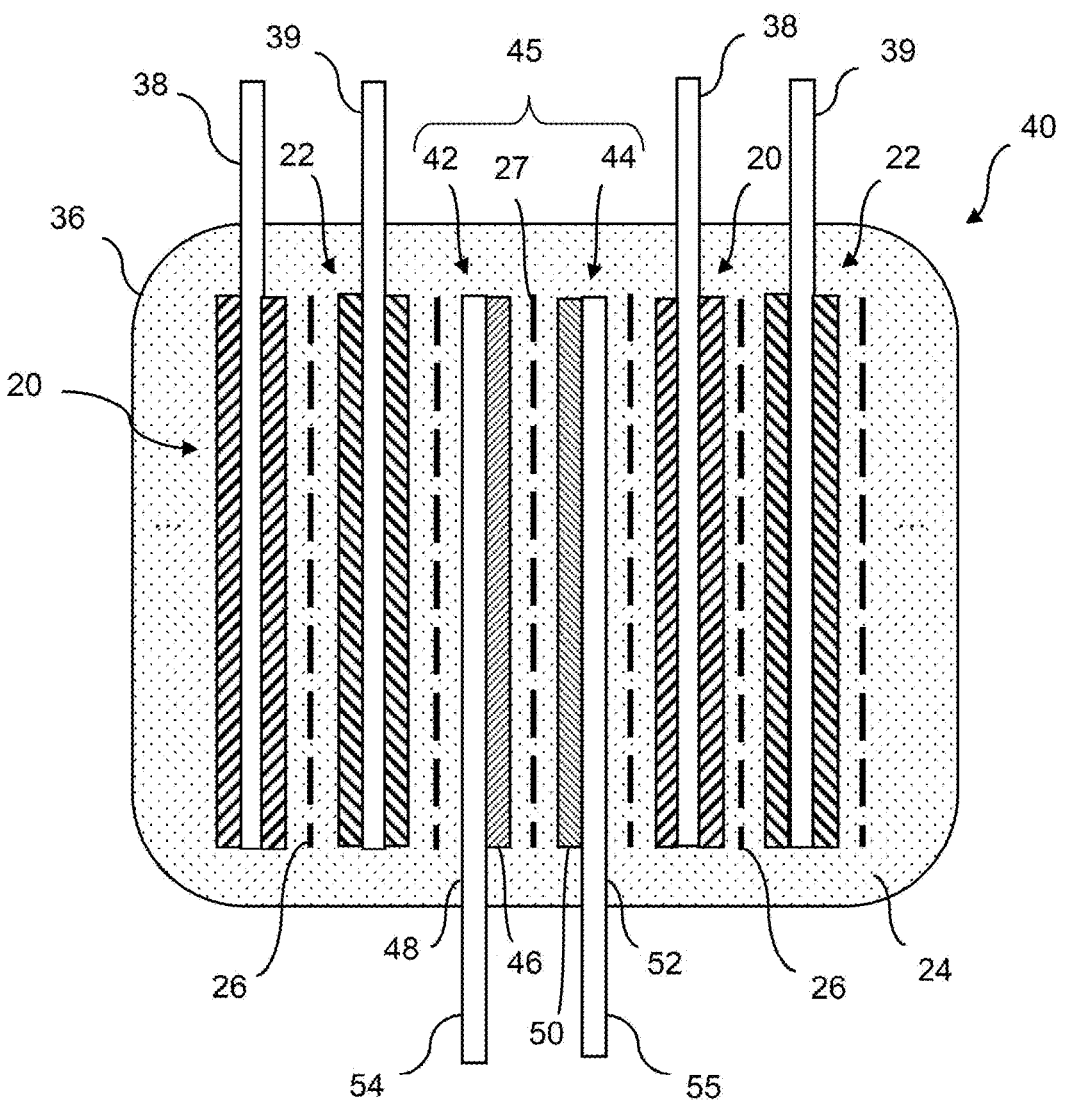
FIG. 5 shows schematically parts of a battery cell in an embodiment of the disclosure.

FIG. 5 shows schematically parts of a battery cell in an embodiment of the disclosure. Referring to FIG. 5, the battery cell 40 comprises a plurality of cathodes 20, a plurality of anodes 22, an electrolyte 24, a plurality of separators 26 and a container 36. Each cathode 20 comprises a cathode active layer on a cathode current collector. The cathode current collectors extend out of the container 36 and form cathode terminal tabs 38 which are connected together. Each anode 22 comprises an anode active layer on an anode current collector. The anode current collectors extend out of the container 36 and form anode terminal tabs 39 which are connected together. The anode terminal tabs 39 are physically separated from the cathode terminal tabs 38 (for example, they may be provided at different locations in a direction perpendicular to the plane of the paper). In FIG. 5, two cathodes 20 and two anodes 22 are shown for simplicity. However, the battery cell may comprise any appropriate number of cathodes and anodes. The cathodes 20 and anodes 22 are working electrodes, and are used for charging and discharging the battery cell. The cathodes 20, anodes 22, electrolyte 24, separators 26 and container 36 may be substantially as described above with reference to FIGS. 3 and 4.

Still referring to FIG. 5, the battery cell in this embodiment also comprises a first reference electrode 42 and a second reference electrode 44. The first reference electrode 42 comprises a first reference electrode active layer 46 on a current collector 48. The second reference electrode 44 comprises a second reference electrode active layer 50 on a current collector 52. In this embodiment, the first and second reference electrode active layers 46, 50 are provided on one side only of the respective current collectors 48, 52. However, if desired, the first and second reference electrode active layers 46, 50 could be provided on both sides of the current collectors 48, 52. The current collectors 48, 52 extend out of the container 36 to provide respective reference terminal tabs 54, 55. The reference terminal tabs 54, 55 are physically separated from each other (for example, they may be at different locations in a direction perpendicular to the plane of the paper). The first and second reference electrodes 42, 44 are separated by a separator 27. The first and second reference electrodes 42, 44 and separator 27 may be provided as a reference electrode unit 45. In this configuration the reference electrode unit 45 is sandwiched between a plurality of working electrodes 20, 22.

In the arrangement of FIG. 5, each reference electrode 42, 44 is essentially planar, and is provided as a layer in the battery cell. The reference electrodes 42, 44 are substantially the same size as the working electrodes 20, 22 in a direction perpendicular to the plane of the electrodes, although it would be possible for them to be smaller or larger. The working and/or reference electrodes may be for example at least 5 cm diagonally, although other values are possible.

In this example, the reference electrodes 42, 44 are located at the centre of the cell. However, it would also be possible for the reference electrodes to be located at one end of the cell, or at any other position within the cell. Furthermore, the two reference electrodes may be located next to each other, or they may be separated (for example, with one or more cathodes and/or anodes between the two reference electrodes).

Figure 6A:
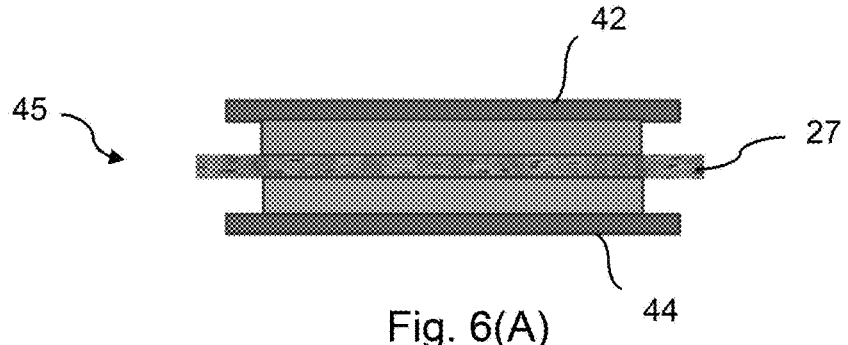
FIGS. 6(A) to 6(C) show possible configurations of a reference electrode unit.
Figures 6B, 6C:
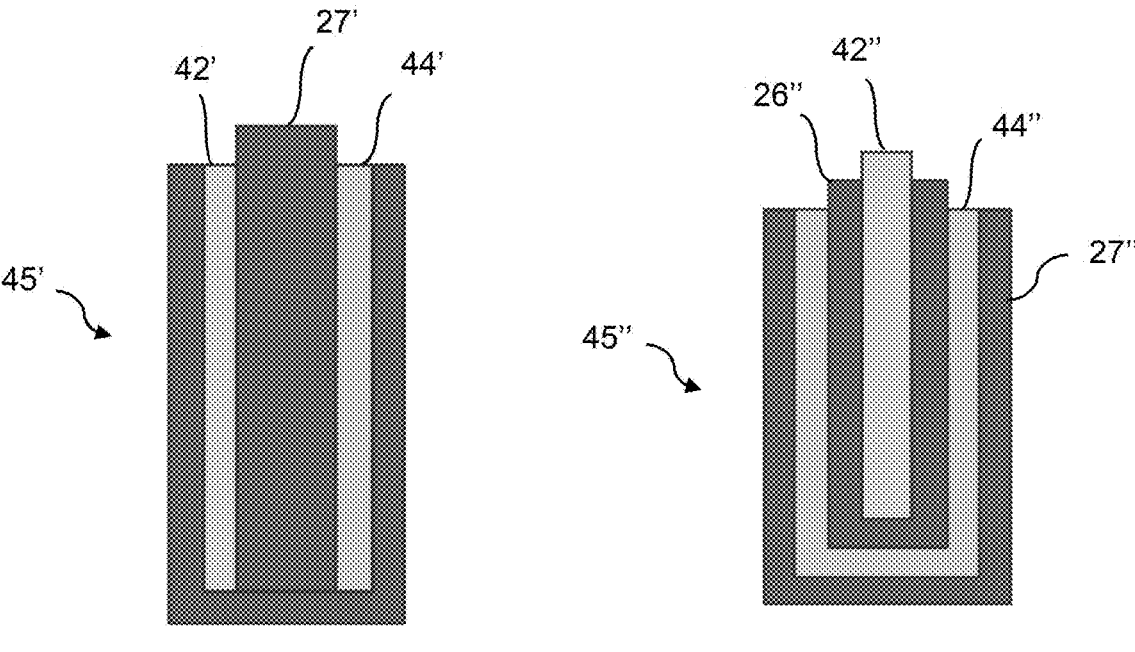

FIGS. 6(A) to 6(C) show a number of possible configurations of a reference electrode unit. In FIG. 6(A) the reference electrode unit 45 is arranged in a sandwich design with two planar reference electrodes 42, 44 on either side of a planar separator 27. In FIG. 6(B) the reference electrode unit 45' is arranged in a cylindrical design with the two reference electrodes 42', 44' on either side of a central cylindrical separator 27'. In FIG. 6(C) the reference electrode unit 45" is arranged in a cylindrical design with one reference electrode 44" radially outwards of the other reference electrode 42", and a cylindrical separator 27" between the two.

In any of the above configurations, the reference electrode unit may be provided in a battery cell between or adjacent to the working electrodes. For example, in the case of a sandwich design, the reference electrode unit may be provided as a layer in a pouch cell or a prismatic cell. In the case of a cylindrical design, the cylindrical reference electrode unit may be provided at the centre of a cylindrical cell. It will be appreciated that these designs are shown by way of example only, and other arrangements will be apparent to the skilled person.

The reference electrode unit, in some examples, may be designed so as not to have a significant impact on the operation of the working electrodes. As an example, the reference electrode unit 45 may occupy less than 10% of the volume of the cell (for example, between 0.2% and 2%), although other values are possible.

Figure 7:
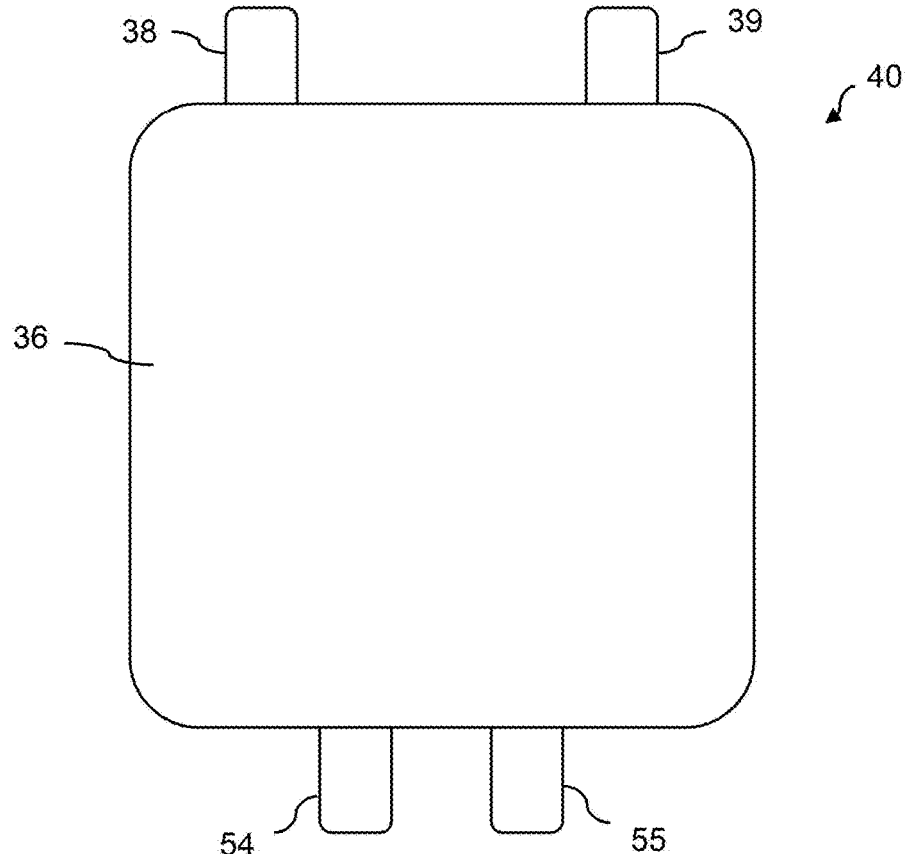
FIG. 7 is a side view of a battery cell in one possible configuration.

FIG. 7 is a side view of a battery cell in one possible configuration. Referring to FIG. 7, the battery cell 40 comprises a container 36 which holds a plurality of cathodes, a plurality of anodes, an electrolyte and a plurality of separators in the manner described above with reference to FIG. 5. In the arrangement of FIG. 7, the working electrode terminal tabs 38, 39 are located at the top of the cell and the reference electrode terminal tabs 54, 55 are located at the bottom of the cell. However, the terminal tabs may be provided at any appropriate location about the cell, as long as they are electrically separated from each other. In this example the cell is a pouch cell and the container is a pouch. However, it will be appreciated that other types of cell, such as a prismatic cell or a cylindrical cell, could be used instead.

In the battery cell 40 described above, the cathodes 20 and anodes 22 function as working electrodes. In operation, lithium ions move from the cathodes 20 through the electrolyte 24 to the anodes 22 during cell charging, and back again during discharge, in a manner known in the art. The first and second reference electrodes 42, 44 are connected for open circuit voltage or instantaneous potential difference measurements and are not involved in cell charging/discharging functions.

Selection of Active Materials

In some embodiments, the active materials of the reference electrodes 42, 44 are chosen as far as possible to fulfil certain requirements. Firstly, the reference electrodes should have an electrochemistry which is stable with the electrolyte with which they are to be used. Secondly, the potential of the reference electrodes should remain relatively stable with changes in the state of charge of the cell. In the case of a Lithium-ion cell, this implies a relatively wide voltage plateau with lithiation ratio. Thirdly, the reference electrodes should have a significant potential difference with the working electrodes (by way of non-limiting example, a potential difference of at least 0.2 V). Fourthly, the two reference themselves should have a significant potential difference (by way of non-limiting example, a potential difference of at least 0.2 V). Fifthly, the capacity of the two reference electrodes should be similar or the same. It will be appreciated that in practice it may not always be possible to fulfil all of these requirements at the same time, and therefore the choice of material may be a balance between the various requirements as well as other factors such as cost and availability of materials.

FIG. 8 shows a plot of open circuit voltage against state of charge for a number of candidate materials for the reference electrodes. The candidate materials are: lithium ion manganese oxide (LMO); lithium nickel manganese cobalt oxide (NCM); a combination of LMO and NCM; lithium-titanate-oxide (LTO); and lithium ferrophosphate (LFP).

From FIG. 8 it can be seen that LTO and LFP have a relative stable open circuit voltage with change in state of charge. These materials also have a significant potential difference with each other and with typical working electrode materials. Therefore, in one embodiment, LTO and LFP are chosen as the active materials for the reference electrodes. However, it will be appreciated that other suitable active materials could be chosen instead or as well.

FIGS. 9A and 9B illustrate how an active material for a reference electrode is attached to the current collector in one embodiment. In this embodiment the reference electrode current collector is in the form of a mesh. The mesh is a layer of material with a plurality of holes. The material may be for example a metal such as copper (Cu), a lithium and tin (Li—Sn) alloy, or any other appropriate material. The active material is a lithium material such as LTO or LFP. A high density lithium metal may be used, which tends to have better durability than a low density one. The active material is compressed into the mesh to form the reference electrode. FIG. 9A illustrates the active material and the mesh before compression. In FIG. 9A, the active material 46 is place on the mesh 48. The active material is then compressed into the mesh under high pressure. FIG. 9B illustrates the reference electrode after compression. In FIG. 9B, the active material has been pressed into the holes in the mesh to form the reference electrode. This arrangement can provide a mechanical way to improve the durability of the reference electrode. Either or both of the reference electrodes can be formed in this way.

If desired, a coating of other material could be provided on the reference electrodes. For example, a layer of carbon, aluminium oxide ($Al_2O_3$) or magnesium oxide (MgO) could be added as a coating for the active material and/or the current collector. This may enhance the durability of the reference electrode.

Cell Monitoring

Figure 10:
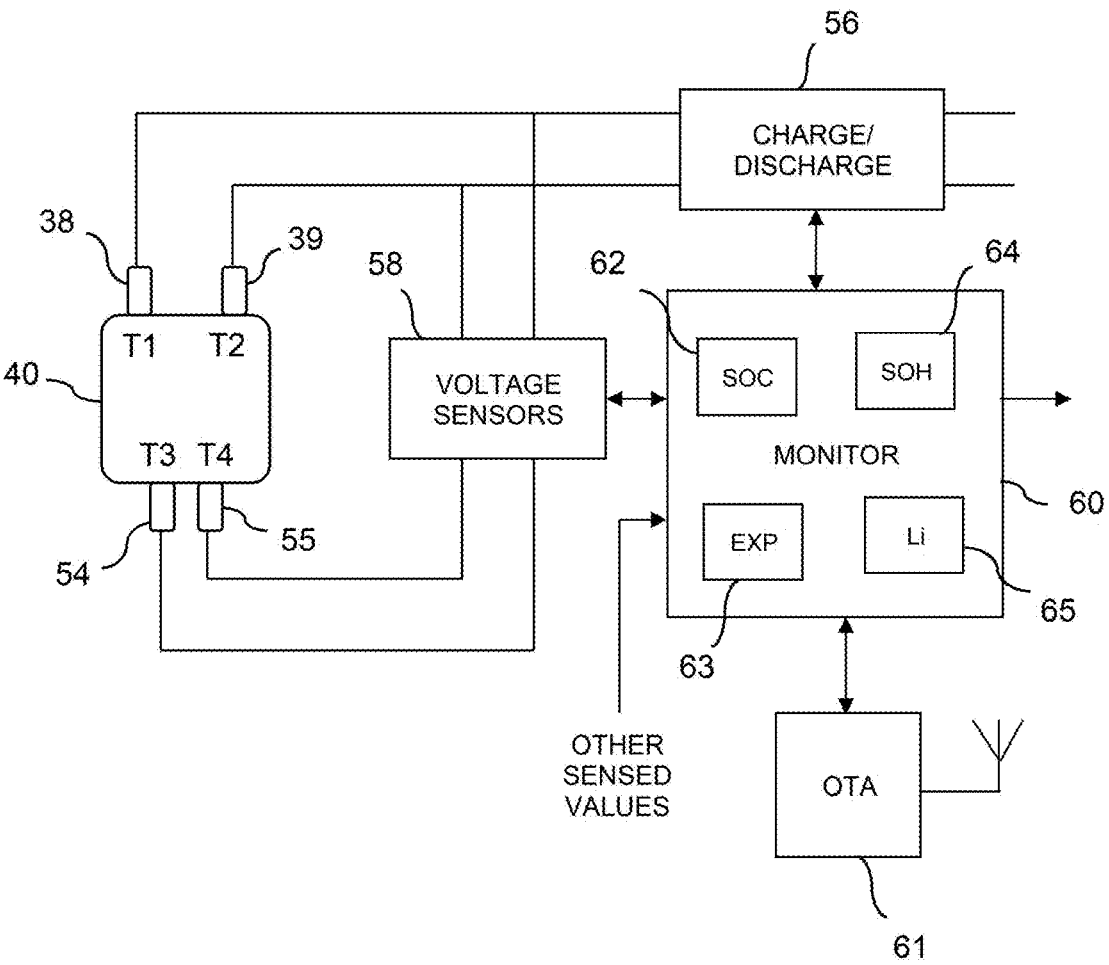
FIG. 10 shows parts of a cell monitoring system in one embodiment.

FIG. 10 shows parts of a cell monitoring system in one embodiment. Referring to FIG. 10, the system comprises battery cell 40, charge/discharge control module 56, voltage sensor module 58 and cell monitoring module 60 and over-the-air (OTA) module 61. The battery cell 40 comprises working electrode terminals 38, 39 and reference electrode terminals 54, 55. The working terminals 38, 39 are connected to the charge/discharge control module 56. The voltage sensor module 58 is connected to each of the working terminals 38, 39 and the reference terminals 54, 55. The voltage sensor module 58 is connected to the cell monitoring module 60. The cell monitoring module 60 is also connected to the charge/discharge control module 56. The battery cell 40 may be in the form described above with reference to FIGS. 5 to 9. The charge/discharge control module 56, voltage sensor module 58 and cell monitoring module 60 may be, for example, part of a battery management unit of the type discussed above with reference to FIGS. 1 and 2.

In the arrangement of FIG. 10, the charge/discharge control module 56 is used to control charging and discharging of the battery cell 40. The voltage sensor module 58 comprises one or more voltage sensors, which are able to sense the voltage (potential difference) across any two of the working terminals 38, 39 and the reference terminals 54, 55. For example, the voltage sensor module 48 may comprise a separate voltage sensor across each pair of terminals, or a single voltage sensor which can be switched between different pairs of terminals, or any combination thereof. The sensed voltage values are fed to the cell monitoring module 60.

The cell monitoring module 60 is configured to monitor cell parameters such as state of charge (SOC) and state of health (SOH) based on the sensed voltage values. The cell monitoring module 60 may also be arranged to monitor other cell parameters such as cell expansion and the onset of lithium plating. The cell monitoring module 60 may receive inputs from other sensors such as current sensors and/or temperature sensors for use in monitoring cell parameters. The cell monitoring module 60 outputs values of the monitored parameters (such as SOC and/or SOH) for use in battery monitoring and control. The cell monitoring module 60 may also control the operation of the charge/discharge control module 56 based on the monitored parameters. The cell monitoring module 60 may be implemented, for example, as a software process executing on a processor and may be, for example, part of a battery management unit such as that discussed above with reference to FIGS. 1 and 2.

In one embodiment, the cell monitoring module 60 comprises a SOC determination unit 62 for determining the state of charge of the cell, and a SOH determination unit 64 for determining the state of health of the cell. The cell monitoring module 60 may also comprise an expansion estimation unit 63 and a lithium plating detection unit 65. Operation of the various units 62, 63, 64, 65 will be described in more detail below.

State of Charge

Conventionally, the state of charge (SOC) of a battery is estimated based on voltage measurements and input current. However, aging effects may reduce the reliability of the voltage as an indicator of the SOC. By introducing a reference electrode, the SOC can be estimated from the potential difference between the reference electrode and each working electrode. Since the reference electrode is not involved in cell charge or discharge, it tends to be more stable than the working electrodes.

In the arrangements of FIGS. 5 to 10, the battery cell is provided with two reference electrodes, each of which comprises a different active material. It has been found that, by using two reference electrodes with different active materials, a better reference for measuring potential difference with cell aging can be obtained. Furthermore, the use of two reference electrodes with different active materials can allow the reference electrodes themselves to be charged/discharged for calibration purposes. This may further enhance the ability of the reference electrodes to provide reliable voltage measurements over time.

Figure 11:
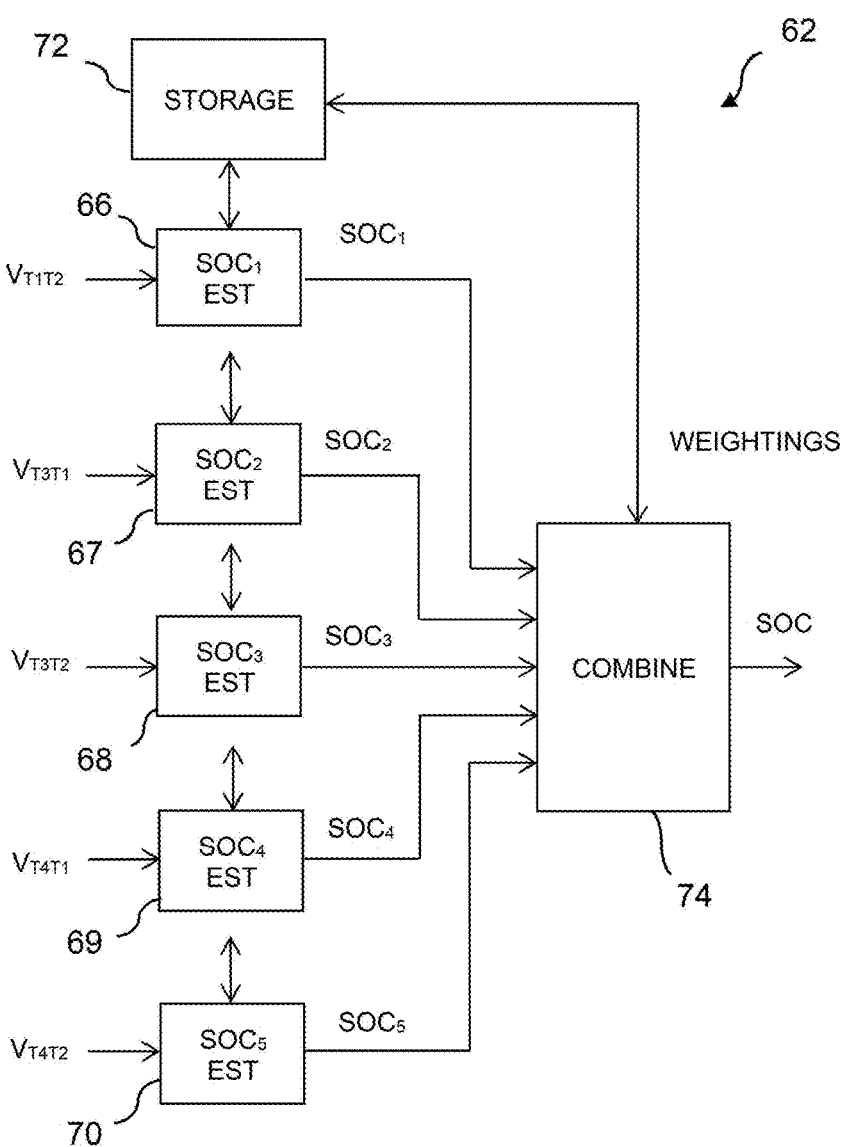
FIG. 11 shows parts of a state of charge (SOC) determination unit in one embodiment.

FIG. 11 shows parts of a state of charge (SOC) determination unit in one embodiment. Referring to FIG. 11, the SOC determination unit 62 comprises first SOC estimation unit 66, second SOC estimation unit 67, third SOC estimation unit 68, fourth SOC estimation unit 69, fifth SOC estimation unit 70, storage unit 72 and combiner 74. The storage unit 72 stores correlations between various cell terminal voltages and the state of charge of the battery cell. For example, the storage unit 72 may store correlations between the state of charge of the battery cell and each of: the voltage (potential difference) $V_{T1T2}$ between the two working terminals 38, 39; the voltage $V_{T3T1}$ between the first reference terminal 54 and the first working terminal 38; the voltage $V_{T3T2}$ between the first reference terminal 54 and the second working terminal 39; the voltage $V_{T4T1}$ between the second reference terminal 55 and the first working terminal 38; and the voltage $V_{T4T2}$ between the second reference terminal 55 and the second working terminal 39. These correlations are determined in advance using laboratory aging data. The correlations may be stored, for example, as a look-up table or as a function (for example, a polynomial function).

In operation, the first SOC estimation unit 66 receives a sensed value of the voltage $V_{T1T2}$ between the two working terminals 38, 39 from the voltage sensor module 58. The first SOC estimation unit 66 uses the sensed voltage $V_{T1T2}$ to obtain a first estimate of the cell's state of charge $SOC_1$ from the storage unit 72, using the stored correlation between the voltage $V_{T1T2}$ and the cell's state of charge. The first estimate $SOC_1$ is fed to the combiner 74. The second SOC estimation unit 67 receives a sensed value of the voltage $V_{T3T1}$ between the first reference terminal 54 and the first working terminal 38 from the voltage sensor module 58. The second SOC estimation unit 67 uses the sensed voltage $V_{T3T1}$ to obtain a second estimate of the cell's state of charge $SOC_2$ from the storage unit 72, using the stored correlation between the voltage $V_{T3T1}$ and the cell's state of charge. The second estimate $SOC_2$ is fed to the combiner 74. The third SOC estimation unit 68 receives a sensed value of the voltage $V_{T3T2}$ between the first reference terminal 54 and the second working terminal 39 from the voltage sensor module 58. The third SOC estimation unit 68 uses the sensed voltage $V_{T3T2}$ to obtain a third estimate of the cell's state of charge $SOC_3$ from the storage unit 72, using the stored correlation between the voltage $V_{T3T2}$ and the cell's state of charge. The third estimate $SOC_3$ is fed to the combiner 74. The fourth SOC estimation unit 69 receives a sensed value of the voltage $V_{T4T1}$ between the second reference terminal 55 and the first working terminal 38 from the voltage sensor module 58. The fourth SOC estimation unit 69 uses the sensed voltage $V_{T4T1}$ to obtain a fourth estimate of the cell's state of charge $SOC_4$ from the storage unit 72, using the stored correlation between the voltage $V_{T4T1}$ and the cell's state of charge. The fourth estimate $SOC_4$ is fed to the combiner 74. The fifth SOC estimation unit 70 receives a sensed value of the voltage $V_{T4T2}$ between the second reference terminal 55 and the second working terminal 39 from the voltage sensor module 58. The fifth SOC estimation unit 70 uses the sensed voltage $V_{T4T2}$ to obtain a fifth estimate of the cell's state of charge $SOC_5$ from the storage unit 72, using the stored correlation between the voltage $V_{T4T2}$ and the cell's state of charge. The fifth estimate $SOC_5$ is fed to the combiner 74.

The combiner 74 receives the estimated values $SOC_1$ to $SOC_5$ combines them to produce an overall estimate of the cell's state of charge SOC. The combination may be a weighted average of the individual SOC estimates. For example, the estimates may be combined using the following equation:

$$SOC = \alpha_1 SOC_1 + \alpha_2 SOC_2 + \alpha_3 SOC_3 + \alpha_4 SOC_4 + \alpha_5 SOC_5 \quad \text{(Equation 1)}$$

where $\alpha_1$ to $\alpha_5$ are weightings of the first estimate $SOC_1$ to the fifth estimate $SOC_5$ respectively.

In one embodiment according to some examples, the weightings are based on confidence levels of the various estimates. For example, the values of $\alpha_1$, $\alpha_2$, $\alpha_3$, $\alpha_4$, and $\alpha_5$ may be calculated from the variances of the data sets on which the correlations between the voltages and the cell's state of charge are based, and stored in the storage unit 72. Alternatively, each estimate may be given an equal weighting, or the weightings could be determined in some other way. The combiner 74 obtains the values of $\alpha_1$, $\alpha_2$, $\alpha_3$, $\alpha_4$, and $\alpha_5$ from the storage unit 72, and uses them to combine the various estimates $SOC_1$ to $SOC_5$ to obtain the overall estimate SOC using the above equation. The overall SOC estimate is output from the combiner 74 for use by the battery management system.

It will be appreciated that not all of the above voltage values need be used to obtain the overall SOC estimate. For example, a single voltage, two voltages, three voltages or four voltages, in any combination, could be used to obtain the overall SOC.

In one embodiment according to some examples, SOC is estimated from using a voltage (potential difference) between each reference electrode and each working electrode. In theory, the SOC estimates from the anode and the cathode should be consistent. However, in practice the estimates may differ due for example to sensor noise and temperature variations. By obtaining a number of estimates and combining them to obtain combined estimation, a more accurate SOC estimate can be obtained.

State of Health

Referring back to FIG. 10, the cell monitoring module 60 also comprises a state of health (SOH) determining unit 64 for determining the state of health of the cell. In one embodiment, a change in the cell's state of health (or cell degradation) is determined from the potential of the anode and/or the cathode at fully charged or fully discharged conditions, or at any intermediate point. Since cell aging will leave distinct footprints on the anode/cathode potential, these potentials can be used in SOH estimation.

Figure 12:
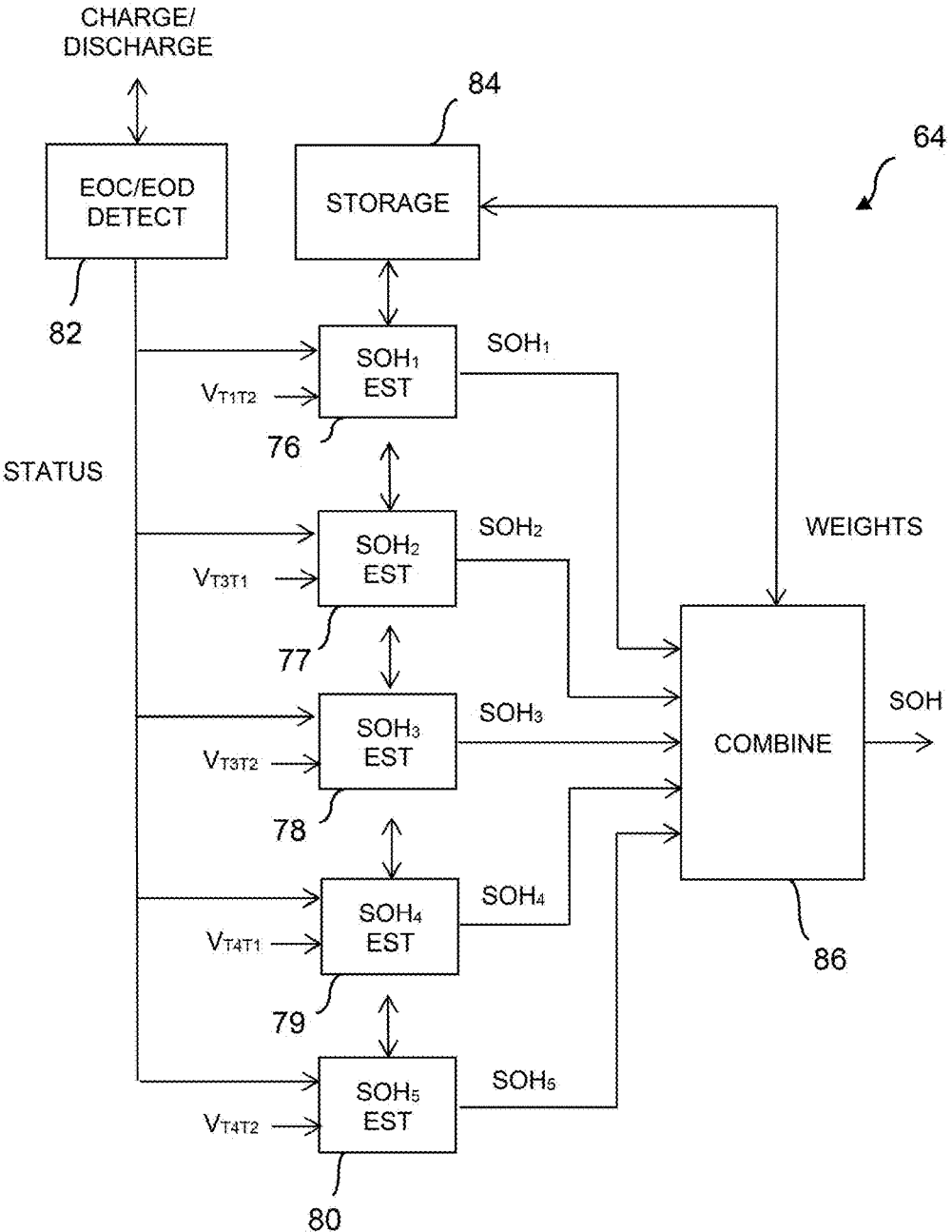
FIG. 12 shows parts of a state of health (SOH) determination unit in one embodiment.

FIG. 12 shows parts of a state of health determination unit in one embodiment. Referring to FIG. 12, the SOH determination unit 64 comprises first SOH estimation unit 76, second SOH estimation unit 77, third SOH estimation unit 78, fourth SOH estimation unit 79, fifth SOH estimation unit 80, end of charge/end of discharge detection unit 82, storage unit 84 and combiner 86.

The storage unit 84 stores correlations between various cell terminal voltages and the state of heath of the battery cell at fully charged and fully discharged conditions. For example, the storage unit 84 may store correlations between the state of health of the battery cell and each of: the voltage $V_{T1T2}$ between the two working terminals 38, 39; the voltage $V_{T3T1}$ between the first reference terminal 54 and the first working terminal 38; the voltage $V_{T3T2}$ between the first reference terminal 54 and the second working terminal 39; the voltage $V_{T4T1}$ between the second reference terminal 55 and the first working terminal 38; and the voltage $V_{T4T2}$ between the second reference terminal 55 and the second working terminal 39. In each case correlations may be stored for both end of charge (EOC) and end of discharge (EOD) conditions (and optionally at other states of charge/discharge). The correlations are determined in advance using laboratory aging data. The correlations may be stored, for example, as a look-up table or as a function (for example, a polynomial function).

In operation, the end of charge/end of discharge detection unit 82 communicates with the charge/discharge unit 56 (see FIG. 10) to determine whether the battery cell 40 has been through a period of rest. If the cell has been through a period of rest, then it is determined whether the cell is either at the end of charge (fully charged) or at the end of discharge (fully discharged). The thus determined status (end of charge or end of discharge) of the battery cell is communicated to each of the first to fifth SOH estimation units 76, 77, 78, 79, 80.

The first SOH estimation unit 76 receives a sensed value of the voltage $V_{T1T2}$ between the two working terminals 38, 39 from the voltage sensor module 58 as well as the status signal from the end of charge/end of discharge detection unit 82. If the status signal indicates that the battery cell is at end of charge, then the first SOH estimation unit 76 uses the sensed voltage $V_{T1T2}$ to obtain an estimate of the cell's state of health from the storage unit 84, using the stored correlation between the voltage $V_{T1T2}$ and the cell's state of health at end of charge. If the status signal indicates that the battery cell is at end of discharge, then the first SOH estimation unit 76 uses the sensed voltage $V_{T1T2}$ to obtain an estimate of the cell's state of health from the storage unit 84, using the stored correlation between the voltage $V_{T1T2}$ and the cell's state of health at end of discharge. The second SOH estimation unit 77 obtains an estimate of the cell's state of health from the storage unit 84 in a similar way, using the sensed value of the voltage $V_{T3T1}$. Likewise, the third to fifth SOH estimation units 98, 79, 80 obtain estimates of the cell's state of health from the storage unit 84 using the sensed values of the voltage $V_{T3T2}$, $V_{T4T1}$ and $V_{T4T2}$ respectively. The estimates of the cell's state of health are fed from the first to fifth SOH estimations unit 76, 77, 78, 79, 80 to the combiner 86.

The combiner 86 receives the estimated state of health values and combines them to produce an overall estimate of the cell's state of health SOH. The combination may be a weighted average of the individual SOH estimates. For example, each estimate may be given an equal weighting, or the weightings may be based on confidence levels of the various estimates, or some other factor, in a similar manner to the SOC estimates discussed above. The overall SOH estimate is output from the combiner 86 for use by the battery management system.

Expansion Estimation

Referring back to FIG. 10, the cell monitoring module 60 may comprise an expansion estimation unit 63. The expansion estimation unit 63 may be used to estimate the expansion of the battery cell based on the anode and cathode SOC levels.

Figure 13A:
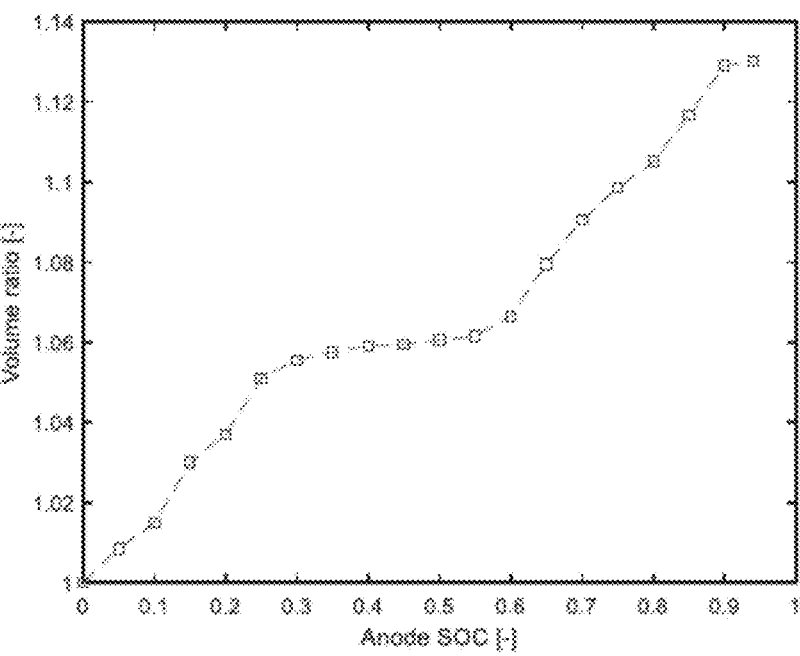
FIGS. 13(A) and 13(B) show how the volume of a battery cell changes with anode SOC and cathode SOC.
Figure 13B:
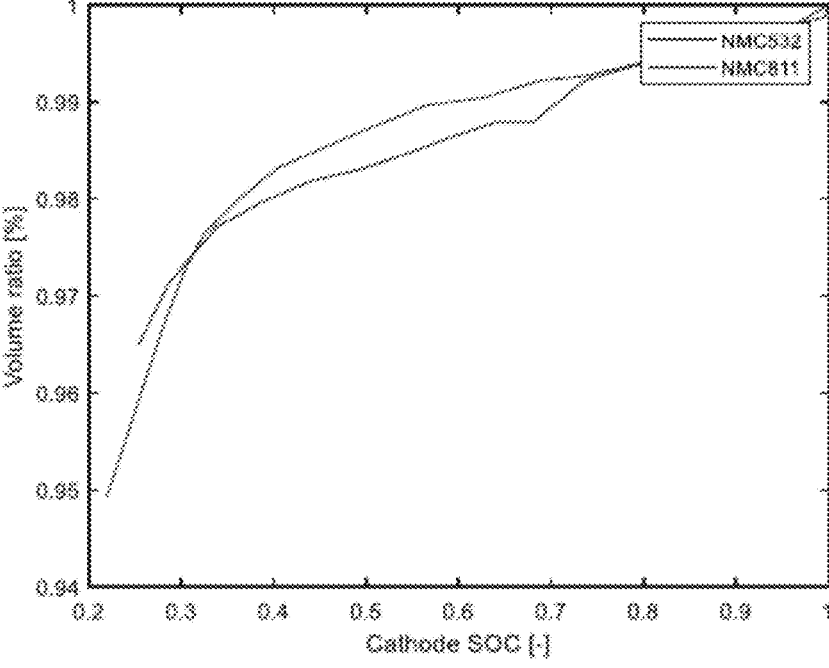

FIG. 13(A) shows how the volume of the battery cell changes with anode SOC, and FIG. 13(B) shows how the volume of the battery cell changes with cathode SOC. It can be seen that there is a correlation between cell volume and both anode SOC and cathode SOC. This correlation can be stored in memory, and then used to estimate the cell's expansion based on the estimated anode and cathode SOC.

In one embodiment according to some examples, the expansion estimation unit 63 estimates the anode SOC and the cathode SOC based on the voltages between the reference electrodes and the anode and cathode. The expansion estimation unit 63 can then estimate the cell's expansion, based on correlations between the cell volume and anode SOC and cathode SOC stored in memory. This allows the cell's crystal expansion and the corresponding stress to be calculated. The estimated expansion can then be output for use in battery monitoring and control. The estimated expansion can also be used to correct the SOC and SOH values. This may be achieved by calculating a predicted pressure of the battery cell from the stress, and comparing the predicted pressure to the actual pressure as sensed by a pressure sensor, to determine an error in the calculated SOC and SOH values.

Detection of Lithium Plating

Referring back to FIG. 10, the cell monitoring module 60 may also comprise a lithium plating detection unit 65. Lithium plating (deposition) is the formation of lithium around the anode of the battery cell during charging. Lithium plating can cause the battery to malfunction over time.

In one embodiment according to some examples, lithium plating detection unit 65 determines the anode voltage using the voltages between the reference electrodes and the anode. The lithium plating detection unit 65 monitors the anode voltage, and detects when the anode voltage is low enough to initiate lithium plating. This can then be used to control the rate at which the charge/discharge module 56 charges the battery. In particular, if the lithium plating detection unit 65 detects the onset of lithium plating, then it may instruct the charge/discharge module 56 to reduce the rate at which the battery is being charged. This can facilitate fast charging, since it may be possible to charge the battery at or close to the fastest rate that can be achieved while avoiding or reducing the risk of lithium plating. Alternatively, charging of the battery could be based directly on anode voltage, rather than cell voltage.

Current Leakage Detection

The cell monitoring module 60 of FIG. 10 can also be used to detect battery leakage. In order to achieve this, the cell monitoring module 60 first determines whether the battery has been at rest (not charged or discharged) for a predetermined amount of time. Once the battery has been at rest for more than the predetermined amount of time, the rates of change of the voltages of the working electrodes are determined. If the rates of change are larger than a predetermined threshold, then it is determined that there is current leakage. This may be confirmed if the absolute drop in voltage is relatively large. The cell monitoring module 60 may then output a current leakage signal for use by the battery management system in battery monitoring and control.

Using two reference electrodes which different active materials may allow more accurate determination of electrode voltages than would otherwise be the case, and thus may allow faster or more accurate detection of current leakage.

Drift of Reference Electrodes

Since the reference electrodes are not involved in cell charge or discharge, they tend to be more stable than the working electrodes, and thus produce more reliable voltage measurements. However, the reference electrodes may still be subject to some age-related drift effects, due to a change in the lithium reaction characteristics of the active materials with time.

In one embodiment, the cell monitoring module 60 is arranged to regularly check the voltage difference between the two reference electrodes. If the difference is quite stable, it indicates that the drifting issue is under control. On the other hand, if the voltage difference changes above a certain threshold, this may indicate that the reference electrodes themselves are subject to age-related drift. In this case, it may be necessary to re-calibrate the reference electrodes.

If the cell monitoring module 60 detects that the reference electrodes are subject to age-related drift, then it may conduct a charge/discharge cycle of the reference electrodes. Since the two reference electrodes have different active materials, the reference electrodes themselves can be charged/discharged independently of the working electrodes. This can allow charging/discharging of the reference electrodes for calibration.

Over-the-Air

Referring back to FIG. 10, the cell monitoring system includes an over-the-air (OTA) module 61. The OTA module 61 allows the system to communicate with external systems, for example using radio frequency (RF) transmission. This can allow the system to communicate battery parameters such as SOC and SOH to an operator, for example, an operator of a fleet of vehicles. This may allow the operator to organise maintenance and replacement schedules. The OTA module 61 may also be used to receive new correlations between parameters such as SOC and SOH and the sensed voltage values. This can allow the cell monitoring module 60 to be updated, for example, as more laboratory aging data becomes available and better correlations are produced. The cell monitoring module 60 may also be updated using a wired connection for example during servicing.

Alternatively, the OTA module 61 may be used to communicate cell voltage values to a central processor, which may process the values to obtain parameters such as SOC, SOH, expansion estimates and/or onset of lithium plating. The thus obtained parameters may then be communicated back to the cell monitoring system. In general, distributed processing is possible, with some functions being performed locally and some remotely.

Battery Pack

The battery cells described above with reference to FIGS. 5 to 9 may be used in a battery pack such as that described above with reference to FIGS. 1 and 2. This can allow a convenient and practical method of sensing parameters such as battery SOC and SOH, as well as lithium plating detection and expansion estimation. The use of two reference electrodes increases the sensor stability and fault detection.

In one embodiment according to some examples, not all of the cells in the battery pack are provided with reference electrodes. For example, a few representative cells in one pack may be sufficient. The representative cells may be provided at those locations where cell degradation is most likely, for example, at those locations which are expected to experience the largest temperature variations. This can allow real time monitoring of the most representative cells.

Monitoring Methods

Figure 14:
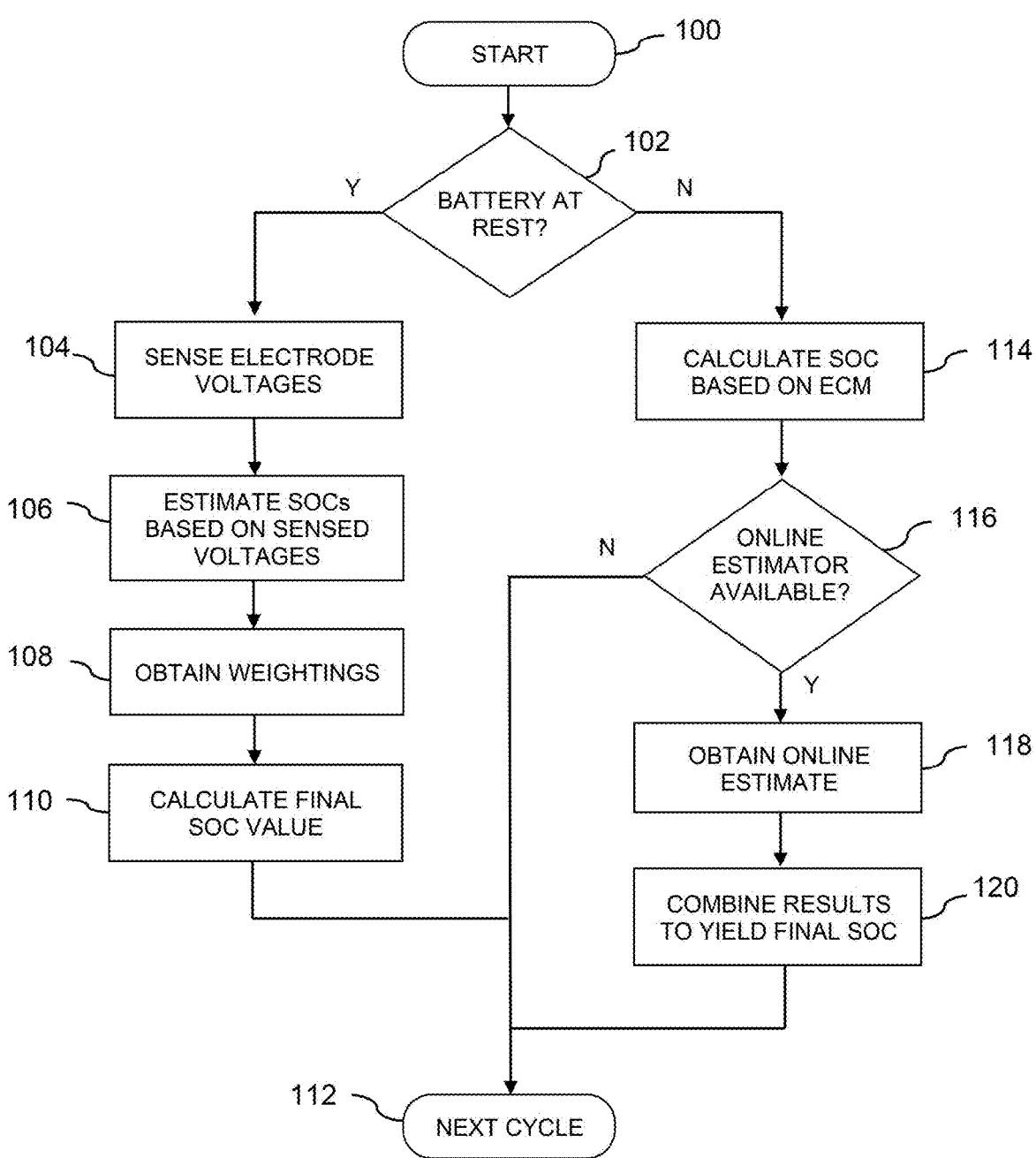
FIG. 14 is a flowchart showing steps taken to calculate the SOC of a battery pack in one embodiment.

FIG. 14 is a flowchart showing steps taken to calculate the SOC of a battery pack in one embodiment. The battery pack comprises a plurality of battery cells connected in a series and/or parallel configuration, at least one of the cells including two reference electrodes in the manner described above. The steps of FIG. 14 may be implemented, for example, as a software process executing on a processor with associated memory. For example, the steps of FIG. 14 may be carried out by a system such as that shown in FIG. 10.

Referring to FIG. 14, processing starts in step 100. In step 102 it is determined whether or not the battery has been at rest for more than a predetermined amount of time. If it is determined that the battery has been at rest for more than a predetermined amount of time, then in step 104 the voltages of the electrodes in the cell with the reference electrodes are sensed. This step may comprise sensing one or more of: the voltage between the first reference electrode and the anode; the voltage between the first reference electrode and the cathode; the voltage between the second reference electrode and the anode; the voltage between the second reference electrode and the cathode; the voltage between the anode and the cathode; and the voltage between the two reference electrodes. In step 106 each of the sensed voltages (or a subset thereof) is used to obtain an estimated value of SOC. This may be achieved using correlations between the voltages and SOC, which correlations may be stored in memory. In step 108, weightings which will be used to combine the various estimated SOCs are obtained. The weightings may be based on confidence levels of the various estimated SOCs. The weightings may be calculated from the variances of the data sets from which the correlations are obtained, and may be stored in memory. In step 110 the final SOC value is calculated using a weighted average of the estimated SOCs. Processing then proceeds to step 112, and an new SOC estimation process is initiated when a new SOC value is required.

If in step 102 it is determined that the battery has not been at rest for more than a predetermined amount of time, then processing proceeds to step 114. In this step, and alternative method for calculating the SOC of the battery is used. This step may comprise the use of an equivalent circuit model to calculate the SOC. For example, the techniques described in International Patent Application number PCT/IB2021/059003, the subject matter of which is incorporated herein by reference, may be used to calculate the SOC. Then in step 116 it is determined whether an online estimate of the SOC is available. If an online estimate is not available then processing proceeds to step 112. If an online estimate is available, then in step 118 the online estimate is obtained, for example, using the OTA unit shown in FIG. 10. Then in step 120 the various estimates are combined to yield the final SOC value. Processing then proceeds to step 112.

Figure 15:
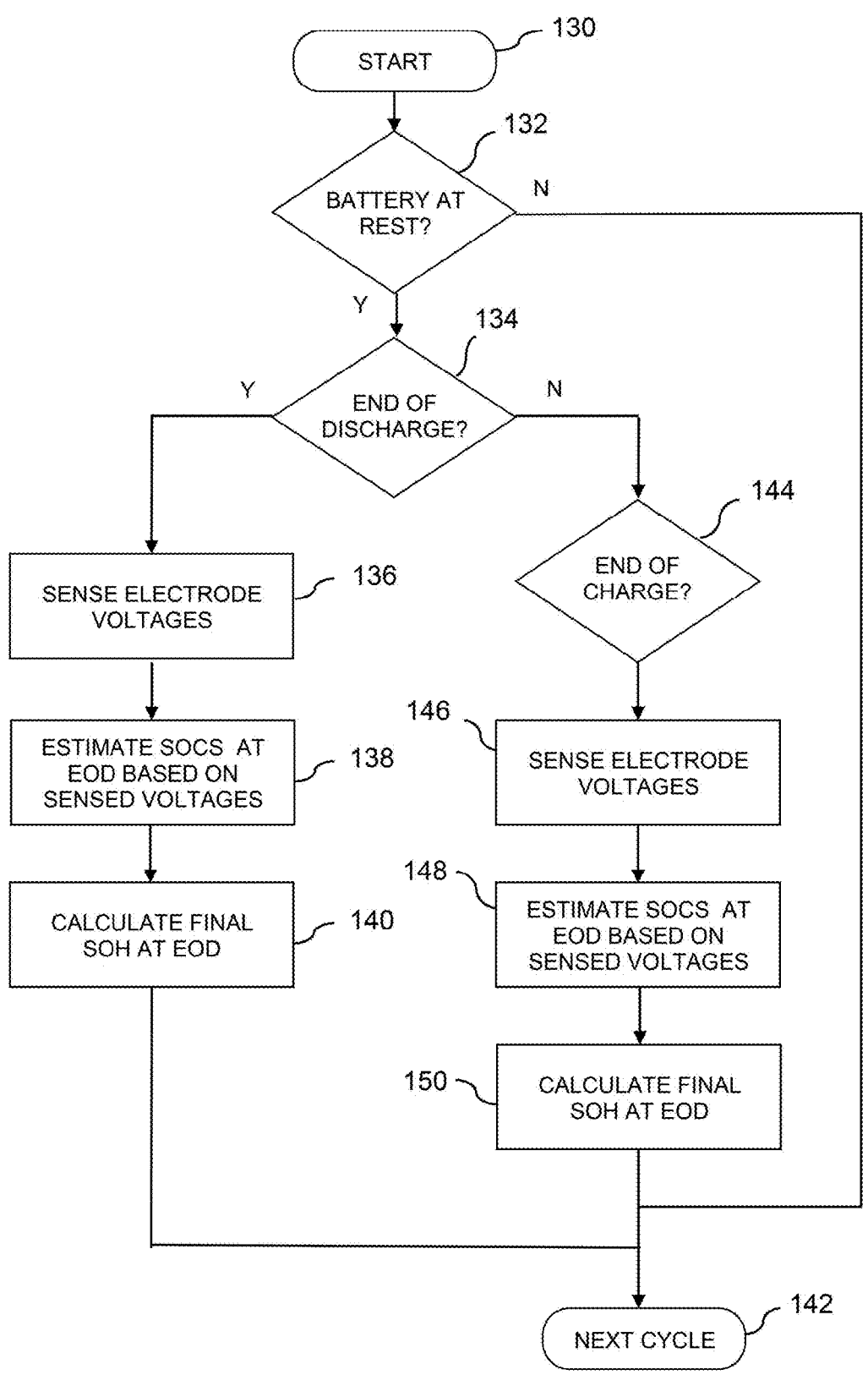
FIG. 15 is a flowchart showing steps taken to calculate the SOH of a battery pack in one embodiment.

FIG. 15 is a flowchart showing steps taken to calculate the SOH of a battery pack in one embodiment. The method may be carried out using a system such as that described above. Referring to FIG. 15, processing starts in step 130. In step 132 it is determined whether the battery has been at rest for more than a predetermined amount of time. If it is determined that the battery has not been at rest for more than a predetermined amount of time, then processing proceeds to step 142. If on the other hand it is determined that the battery has been at rest for more than a predetermined amount of time, then in step 134 it is determined whether the battery is at end of discharge (EOD). If it is determined that the battery is at end of discharge, then in step 136 the voltages of the electrodes in the battery cell with the reference electrodes are sensed. This step may comprise sensing one or more of: the voltage between the first reference electrode and the anode; the voltage between the first reference electrode and the cathode; the voltage between the second reference electrode and the anode; the voltage between the second reference electrode and the cathode; the voltage between the anode and the cathode; and the voltage between the two reference electrodes. In step 138 each of the sensed voltages (or a subset thereof) is used to obtain an estimated value of SOH. This may be achieved using correlations between the voltages and SOH at end of discharge, which correlations may be stored in memory. In step 140 the final SOH value is calculated using a weighted average of the estimated SOHs. The weightings may be based on confidence levels of the various estimated SOHs, and may be stored in memory. Processing then proceeds to step 142, and a new SOH estimation process is initiated when a new SOH value is required.

If in step 134 it is determined that the battery is not at end of discharge, then in step 144 it is determined whether the battery is at end of charge (EOC). If it is determined that the battery is at end of charge, then in step 146 the voltages of the electrodes in the battery cell with the reference electrodes are sensed. In step 148 each of the sensed voltages (or a subset thereof) is used to obtain an estimated value of SOH. This may be achieved using correlations between the voltages and SOH at end of charge, which correlations may be stored in memory. In step 150 the final SOH value is calculated using a weighted average of the estimated SOHs. The weightings may be based on confidence levels of the various estimated SOHs, and may be stored in memory. Processing then proceeds to step 142, and a new SOH estimation process is initiated when a new SOH value is required.

Figure 16:
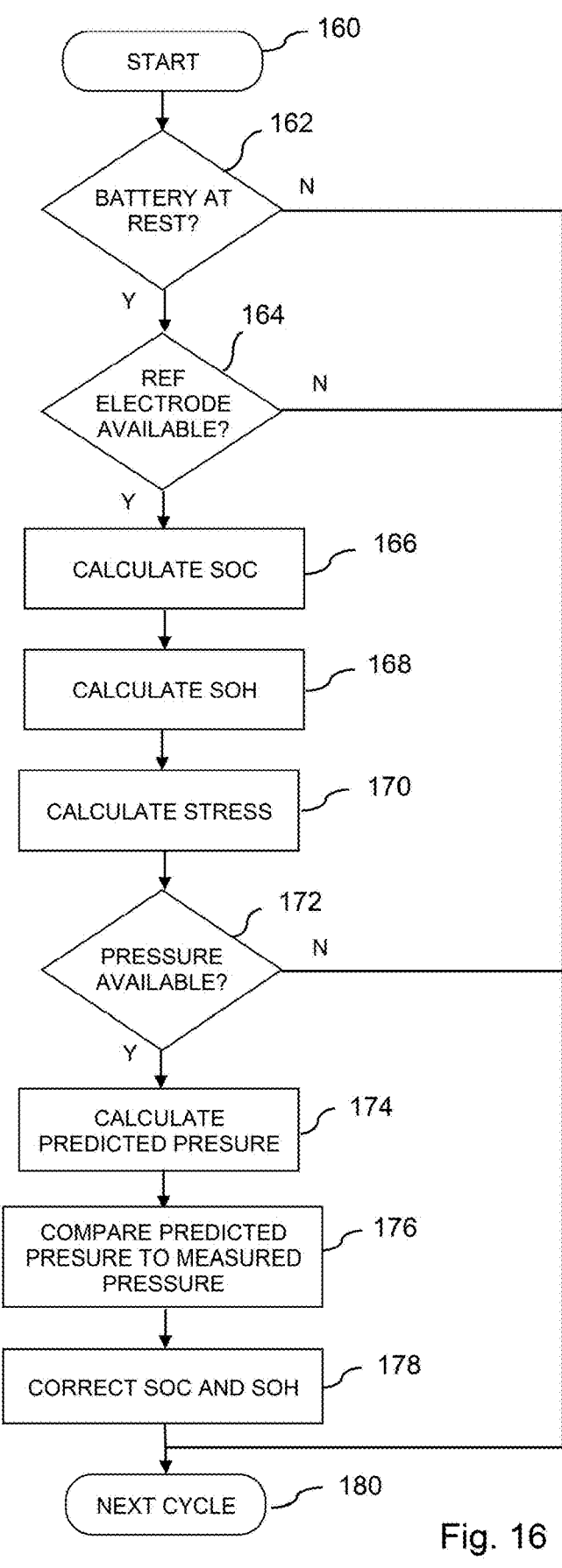
FIG. 16 is a flowchart showing steps taken to estimate the expansion of a battery pack in one embodiment.

FIG. 16 is a flowchart showing steps taken to estimate the expansion of a battery pack in one embodiment. The method may be carried out using a system such as that described above. Referring to FIG. 16, processing starts in step 160. In step 162 it is determined whether the battery has been at rest for more than a predetermined amount of time. If it is determined that the battery has not been at rest for more than a predetermined amount of time, then processing proceeds to step 180. If on the other hand it is determined that the battery has been at rest for more than a predetermined amount of time, then in step 164 it is determined whether sensed voltages from a battery cell containing reference electrodes are available. If the sensed voltages are not available, then processing proceeds to step 180. If on the other hand the sensed voltages are available, then in step 166 the anode and cathode SOC values are calculated for the battery cell with the reference electrodes. This may be achieved using the techniques described above. For example, the anode SOC may be calculated by sensing the voltage between each of the reference electrodes and the anode, using each of the sensed voltages to obtain an estimate of the SOC based on the correlations between the sensed voltages and SOC, and combining the estimates using a weighted average to yield the anode SOC. The cathode SOC may be calculated in a similar way. In step 168 anode and cathode SOH values are calculated. This may be achieved using the techniques described above. In step 170 the values of the anode and cathode SOC and SOH are used to obtain an estimate of cell stress. This may be achieved using correlations between the anode and cathode SOC and SOH voltages and cell stress, to obtain a stress value based on each of the anode and cathode SOC and SOH. The various stress values may be combined using a weighted average to obtain a final estimated stress level. The final estimate of cell stress may be used to estimate expansion of the battery pack, using a correlation between the cell stress and battery pack expansion, which correlation may be stored in memory.

In step 172 it is determined whether cell pressure data is available. The cell pressure data may be obtained from a pressure sensor in the battery pack. If cell pressure data is not available, then processing proceeds to step 180. If on the other hand cell pressure data is available, then in step 174 a predicted cell pressure value is calculated from the estimate of cell stress. This may be achieved using a correlation between cell stress and pressure. In step 176 the predicted cell pressure value is compared to the measured pressure value. In step 178, the values of SOC and/or SOH are corrected based on the difference between the predicted pressure value and the measured pressure value. This can allow more accurate values of SOC and/or SOH to be obtained. Processing then proceeds to step 180, and a new cell stress estimation process is initiated when a new cell stress value is required.

Some of the features of the disclosure have been described above with reference to various embodiments. Where appropriate, features of one embodiment may be used with any other embodiment. Furthermore, it will be appreciated that the disclosure is not limited to these embodiments, and variations in detail may be made within the scope of the appended claims.

The invention claimed is:

1. A battery cell comprising:

an electrolyte;

first and second working electrodes in the electrolyte; and first and second reference electrodes in the electrolyte;

wherein the first and second reference electrodes each comprises an active material on a current collector, the current collector of at least one of the first and second reference electrodes comprises a mesh and the active material is pressed into the mesh, and the active material of the first reference electrode is different from the active material of the second reference electrode.

2. The battery cell according to claim 1, wherein the first and second working electrodes each comprises an active material on a current collector, and the active material of the first working electrode is different from the active material of the second working electrode.

3. The battery cell according to claim 2, wherein the active materials of the first and second reference electrodes are different from the active materials of the first and second working electrodes.

4. The battery cell according to claim 1, wherein the active materials of the first and second reference electrodes are selected from: a lithium metal; a tin metal; a bismuth metal; other types of metal capable of undergoing a lithiation and de-lithiation process; and any material capable of undergoing a lithiation and de-lithiation process with a stable electrochemical potential plateau.

5. The battery cell according to claim 1, the battery cell comprising a container which contains the first and second working electrodes, the first and second reference electrodes and the electrolyte, wherein each of the first and second working electrodes and each of the first and second reference electrodes comprises a terminal extending out of the container.

6. The battery cell according to claim 1, wherein the current collector of each of the first and second reference electrodes is substantially planar, and the active material is provided on either side of the current collector.

7. The battery cell according to claim 1, wherein the first and second reference electrodes are substantially the same size and/or shape as the first and second working electrodes.

8. The battery cell according to claim 1, further comprising a separator between the first and second reference electrodes.

9. The battery cell according to claim 8, wherein the first and second reference electrodes and the separator form a reference electrode unit.

10. The battery cell according to claim 9, wherein the reference electrode unit is substantially planar, and is provided between a plurality of planar working electrodes in a pouch cell or a prismatic cell.

11. The battery cell according to claim 9, wherein the reference electrode unit is substantially cylindrical, and is provided at the centre of a cylindrical cell.

12. A battery pack comprising a plurality of battery cells, each of the battery cells comprising:

an electrolyte;

first and second working electrodes in the electrolyte, at least one of the battery cells further comprising first and second reference electrodes in the electrolyte;

at least one voltage sensor arranged to sense;

a voltage between the first reference electrode and at least one of the first and second working electrodes, a voltage between the second reference electrode and at least one of the first and second working electrodes, and a voltage between the first and second reference electrodes; and a monitoring unit arranged to monitor a parameter of the battery pack based on at least one sensed voltage, the monitoring unit being arranged to monitor the sensed voltage and to output a signal indicating reference electrode drift when a change in the at least one sensed voltage over time exceeds a threshold, wherein the first and second reference electrodes each comprises an active material on a current collector, and the active material of the first reference electrode is different from the active material of the second reference electrode.

13. The battery pack according to claim 12, wherein the parameter is at least one of: state of charge; state of health; onset of lithium plating; and battery expansion.

14. The battery pack according to claim 12, wherein the monitoring unit is configured to perform a charge/discharge cycle of the first and second reference electrodes in dependence on the signal indicating reference electrode drift.

15. The battery pack according to claim 12, wherein the first and second reference electrodes are provided in at least one but not all of the battery cells.

16. A method of monitoring a battery cell, the battery cell comprising first and second working electrodes and first and second reference electrodes in an electrolyte, wherein the first and second reference electrodes each comprises an active material on a current collector, and the active material of the first reference electrode is different from the active material of the second reference electrode, the method comprising:

sensing a voltage between the first reference electrode and at least one of the first and second working electrodes;

sensing a voltage between the second reference electrode and at least one of the first and second working electrodes;

sensing a voltage between the first and second reference electrodes; and outputting, upon monitoring a parameter of the battery cell based on the sensed voltages, a signal indicating reference electrode drift when a change in the sensed voltages over time exceeds a threshold.

17. The method of claim 16, further comprising:

performing a charge/discharge cycle of the first and second reference electrodes in dependence on the signal indicating reference electrode drift.

* * * * *